US008730350B2

(12) United States Patent
Ishii et al.

(10) Patent No.: US 8,730,350 B2
(45) Date of Patent: May 20, 2014

(54) IMAGE CAPTURING/REPRODUCING APPARATUS

(75) Inventors: Akiyoshi Ishii, Yokohama (JP); Yukihiko Kuribayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 13/130,161

(22) PCT Filed: Dec. 7, 2009

(86) PCT No.: PCT/JP2009/006663
§ 371 (c)(1), (2), (4) Date: May 19, 2011

(87) PCT Pub. No.: WO2010/067572
PCT Pub. Date: Jun. 17, 2010

(65) Prior Publication Data

US 2011/0221928 A1 Sep. 15, 2011

(30) Foreign Application Priority Data

Dec. 9, 2008 (JP) ................................ 2008-313401

(51) Int. Cl.
*H04N 5/76* (2006.01)
*H04N 5/262* (2006.01)
*H04N 9/80* (2006.01)

(52) U.S. Cl.
USPC ......................... 348/231.4; 348/239; 386/241

(58) Field of Classification Search
USPC ........... 348/231.1–231.4, 220.1, 231.99, 239; 386/241, 242
See application file for complete search history.

(56) References Cited

U.S. PATENT DOCUMENTS

| | | | | |
|---|---|---|---|---|
| 6,762,791 | B1 * | 7/2004 | Schuetzle | 348/231.3 |
| 7,830,421 | B2 * | 11/2010 | Kawachi | 348/231.2 |
| 2002/0016971 | A1 * | 2/2002 | Berezowski et al. | 725/105 |
| 2002/0021361 | A1 * | 2/2002 | Kitajima et al. | 348/232 |
| 2004/0150723 | A1 * | 8/2004 | Seo et al. | 348/207.1 |
| 2006/0007314 | A1 | 1/2006 | Fong | |
| 2007/0011182 | A1 * | 1/2007 | Chiu | 707/101 |
| 2008/0088747 | A1 * | 4/2008 | Kita et al. | 348/715 |
| 2008/0180549 | A1 * | 7/2008 | Lee et al. | 348/231.2 |

FOREIGN PATENT DOCUMENTS

| | | | |
|---|---|---|---|
| CN | 1615009 | A | 5/2005 |
| CN | 1692631 | A | 11/2005 |
| CN | 201078853 | Y | 6/2008 |
| EP | 984367 | A2 | 3/2000 |
| EP | 1821306 | A2 | 8/2007 |
| JP | 2005-020484 | A | 1/2005 |
| JP | 2005-080056 | A | 3/2005 |
| JP | 2007-221681 | A | 8/2007 |
| JP | 2008-035238 | A | 2/2008 |
| WO | 01/26364 | A | 4/2001 |
| WO | 01/26364 | A1 | 4/2001 |

* cited by examiner

*Primary Examiner* — Kelly L Jerabek
(74) *Attorney, Agent, or Firm* — Canon U.S.A., Inc. IP Division

(57) ABSTRACT

Only images captured in a snapshot movie capture mode are extracted and are continuously reproduced. Also, second audio data prepared separately from first audio data that is recorded during image capturing is reproduced in place of the first audio data. Accordingly, an effect of change in images at predetermined intervals at a good tempo can be obtained. Furthermore, an interrupt of audio data at change of images can be prevented, so that discomfort felt by a user can be decreased.

11 Claims, 6 Drawing Sheets

200
MICROCOMPUTER
101 IMAGE PICKUP LENS
102 IMAGE PICKUP DEVICE
103 IMAGE PROCESSING UNIT
104 DISPLAY CONTROL UNIT
105 DISPLAY UNIT
106 AUDIO INPUT UNIT
107 AUDIO INPUT CONTROL UNIT
108 IMAGE STREAM GENERATING UNIT
109 IMAGE STREAM RECORDING CONTROL UNIT
110 IMAGE STREAM RECORDING UNIT
111 OPERATION UNIT
112 CAPTURING CONTROL UNIT
113 MANAGEMENT INFORMATION CONTROL UNIT
114 MANAGEMENT INFORMATION RECORDING UNIT

IMAGE CAPTURING/REPRODUCING APPARATUS

TECHNICAL FIELD

The present invention relates to an image capturing/reproducing apparatus for capturing images. Particularly, the present invention relates to an image capturing/reproducing apparatus having a first capture mode in which a user provides instructions to start and end recording and a second capture mode in which image capturing automatically ends after a predetermined time has elapsed since the user provided an instruction to start recording. Also, the present invention relates to a technique of reproducing arbitrary music data prepared by a user in place of audio data recorded during image capturing when images captured in the second capture mode are reproduced.

BACKGROUND ART

In recent years, digital video cameras using a random access recording medium, such as an optical disc, a hard disk drive, or a flash memory in addition to a conventional known magnetic tape, have become widespread as apparatuses for recording movies.

Also, more and more digital still cameras used to record still images have had a function of recording movies.

Those apparatuses have features of being capable of randomly accessing a recording medium and having high compatibility with other digital apparatuses, such as personal computers (PCs). Therefore, the apparatuses can easily create a short-time movie file (hereinafter snapshot movie) and transmit the file by attaching it to an E-mail or distribute the file by uploading it to a Web page.

Apparatuses are known, such as digital video cameras and digital still cameras, that are capable of selecting, as a recording mode, (i) a normal capture mode based on a conventional usage method in which image capturing is continuously performed within an allowable capacity of a recording medium until an instruction from a user is provided or (ii) a snapshot movie capture mode in which image capturing is automatically stopped after a predetermined period of time (e.g., 5 seconds) has elapsed from the start of the image capturing in order to create a snapshot movie (e.g., see PTL).

However, in the recording apparatus described in PTL, an image captured in the normal capture mode is indistinguishable from an image captured in the snapshot movie capture mode during reproduction, so that both types of images are reproduced mixed together. This causes a problem that an effect of change in surprising images at a good tempo that can be obtained by reproducing only images captured in the snapshot movie capture mode is insufficient.

Furthermore, if audio data recorded during image capturing is reproduced, the audio data is discontinuous at predetermined intervals, which gives discomfort to a listener disadvantageously.

CITATION LIST

Patent Literature

PTL 1: Japanese Patent Laid-Open No. 2005-20484

SUMMARY OF INVENTION

The present invention has been made in view of the above-described problems and provides an image capturing/reproducing apparatus capable of capturing images by allowing a user to switch between a normal capture mode and a snapshot movie capture mode, continuously reproducing only images captured in the snapshot movie capture mode during reproduction, and reproducing audio data prepared by the user in place of audio data recorded during image capturing.

An image capturing/reproducing apparatus according to an aspect of the present invention includes a capture mode switching unit configured to switch between a first capture mode in which a user provides instructions to start and end recording images and a second capture mode in which image capturing automatically ends after a predetermined period of time has elapsed since the user provided an instruction to start recording images, an image reproduction mode switching unit configured to switch between a first image reproduction mode in which images recorded in the first capture mode and the second capture mode can be reproduced and a second image reproduction mode in which only images recorded in the second capture mode can be reproduced, and a control unit configured to be capable of reproducing first audio data recorded in the first capture mode and the second capture mode and second audio data recorded separately from the first audio data, reproduce the first audio data in a case where the first image reproduction mode is selected by the image reproduction mode switching unit, and reproduce the second audio data in a case where the second image reproduction mode is selected by the image reproduction mode switching unit.

As described above, according to the image capturing/reproducing apparatus according to the aspect of the present invention, only images captured in the snapshot movie capture mode can be extracted and reproduced, and predetermined audio data selected by a user can be reproduced in place of audio data recorded during image capturing. Accordingly, images are reproduced by being changed at predetermined time intervals at a good tempo, so that surprising reproduced images can be obtained and that audio data is continuously reproduced. As a result, discomfort felt by a listener can be decreased.

The above and other features and advantages of the present invention will become more apparent from the following detailed description taken in conjunction with the accompanying drawings.

BRIEF DESCRIPTION OF DRAWINGS

The accompanying drawings, which are incorporated in and constitute a part of the specification, illustrate exemplary embodiments, features and aspects of the present invention and, together with the description, serve to explain the principles of the present invention.

DESCRIPTION OF EMBODIMENTS

Exemplary embodiments, features, and aspects of the present invention will now be described in detail below with reference to the attached drawings.

First Embodiment

Figure 1:
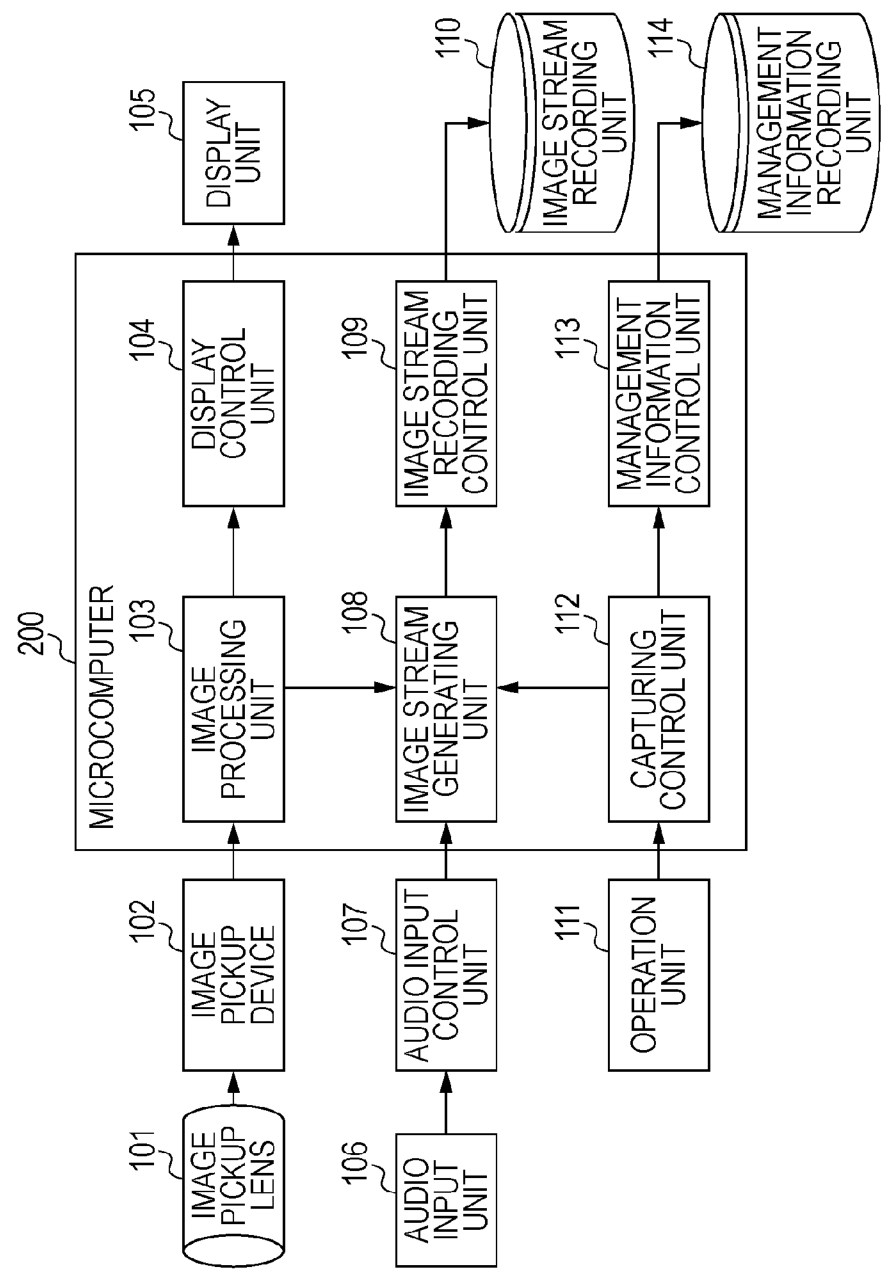
FIG. 1 illustrates a schematic configuration during image capturing of an image capturing/reproducing apparatus according to a first embodiment of the present invention.

FIG. 1 is a block diagram illustrating a configuration during image capturing of an image capturing/reproducing apparatus according to a first embodiment of the present invention.

An image pickup lens 101 is a lens for capturing images, and an image pickup device 102 is provided. Incident light to the image pickup lens 101 is converted to an image signal by the image pickup device 102, and the image signal is transmitted to an image processing unit 103. The image processing unit 103 performs image signal processing, such as noise reduction, gain adjustment, and color tone correction, on the image signal received from the image pickup device 102, and transmits the processed image signal to a display control unit 104 and an image stream generating unit 108. The display control unit 104 combines the image signal received from the image processing unit 103 with capture information serving as an OSD (On Screen Display) image, converts the signal to an image signal to be output to a display unit 105, and outputs the converted signal.

An audio input unit 106 is a microphone or the like used for recording and is connected to an audio input control unit 107. The audio input unit 106 converts ambient sound to an electric signal and transmits the electric signal to the audio input control unit 107. The audio input control unit 107 performs audio signal processing, such as noise reduction, gain adjustment, and balance adjustment, on the audio signal received from the audio input unit 106, and then transmits the processed audio signal to the image stream generating unit 108.

The image stream generating unit 108 is an encoder for combining an image signal received from the image processing unit 103 and an audio signal received from the audio input control unit 107, converting a composite signal obtained thereby to a predetermined image format, and generating an image stream. The image stream generating unit 108 transmits the image stream obtained through the conversion to an image stream recording control unit 109.

The image stream recording control unit 109 includes a buffer memory (not illustrated) for temporarily storing an image stream and accumulates the image stream received from the image stream generating unit 108 in the buffer memory. The image stream recording control unit 109 converts the image stream in the buffer memory to a predetermined file format as necessary and records the image stream in the image stream recording unit 110 in order to prevent the buffer memory from being exhausted.

The image stream recording unit 110 is a recording medium connected to the image capturing/reproducing apparatus and records an image stream in response to an instruction provided from the image stream recording control unit 109.

An operation unit 111 includes a cross key, a recording start key, a touch panel, a capture mode switching button, and the like provided in the image capturing/reproducing apparatus. When a user operates the operation unit 111, information corresponding to the operation is transmitted as a signal to a capturing control unit 112. The capturing control unit 112 receives the signal generated through the operation of the operation unit 111 performed by the user and controls the operation of the image capturing/reproducing apparatus in accordance with the signal.

Operations performed by the user include providing instructions necessary to capture images, such as instructions to start and stop image capturing, and also include providing an instruction to switch between a first capture mode in which the user provides instructions to start and stop image capturing and a second capture mode in which image capturing automatically ends after a predetermined period of time has elapsed since the user provided an instruction to start image capturing.

In the first capture mode (normal capture mode), the capturing control unit 112 performs control to start and stop the image stream generating unit 108 in response to instructions to start and stop image capturing provided by the user, and also notifies a management information control unit 113 that image capturing was performed in the first capture mode. In the second capture mode (snapshot movie capture mode), the capturing control unit 112 receives an instruction to start image capturing from the user, performs control to start the image stream generating unit 108, performs control to stop the image stream generating unit 108 after a predetermined period of time has elapsed, and also notifies the management information control unit 113 that image capturing was performed in the second capture mode.

The management information control unit 113 embeds the type of capture mode notified from the capturing control unit 112 in management information that is generated while being associated with a captured image, and records the information in a management information recording unit 114. The management information recording unit 114 records the management information generated by the management information control unit 113 while associating it with the captured image.

Part or all of the image processing unit 103, the display control unit 104, the image stream generating unit 108, the image stream recording control unit 109, the capturing control unit 112, and the management information control unit 113 may be configured as a program that operates in a microcomputer 200.

Figure 2:
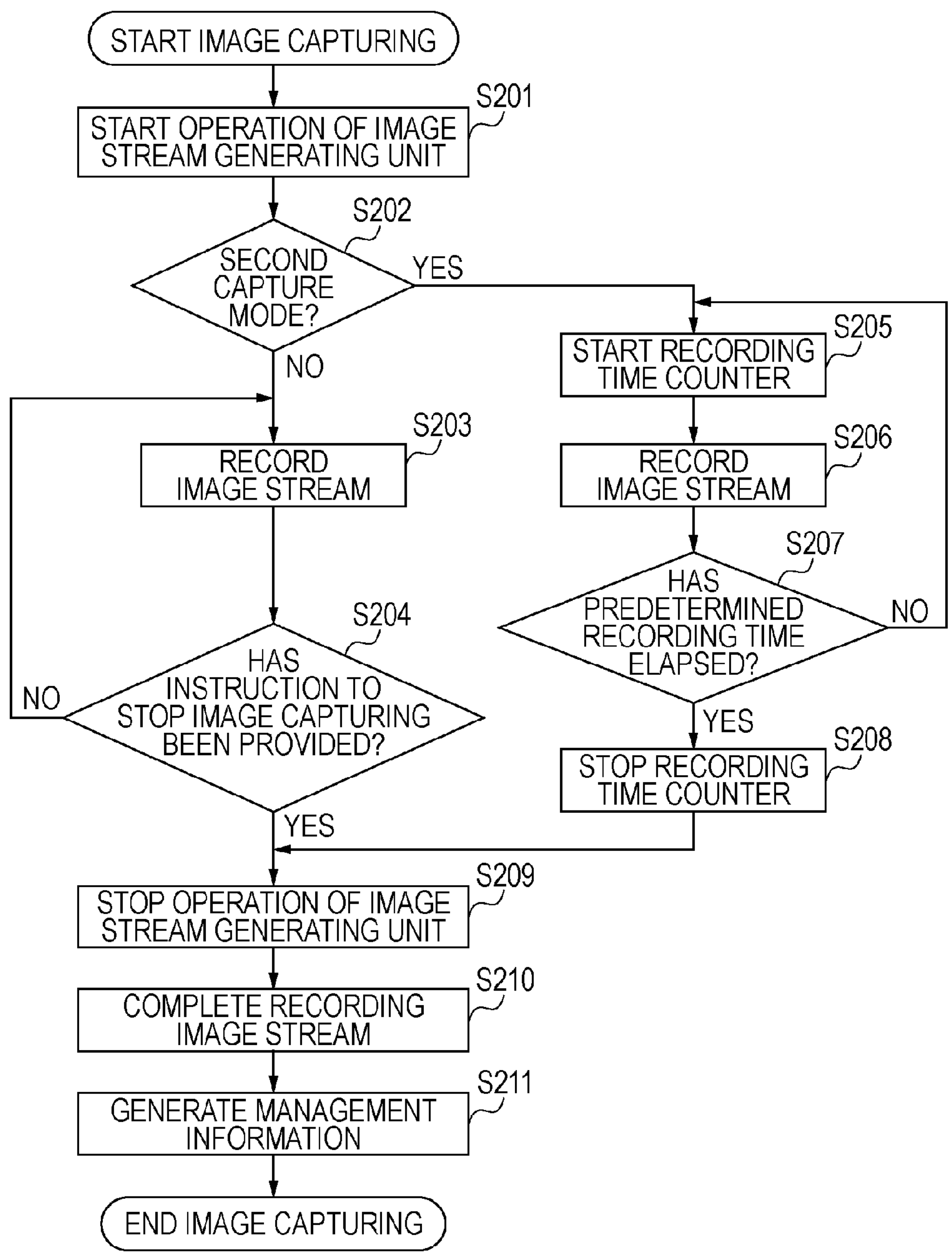
FIG. 2 is a flowchart illustrating an image capturing operation of the image capturing/reproducing apparatus according to the first embodiment of the present invention.

FIG. 2 is a flowchart illustrating an image capturing operation of the image capturing/reproducing apparatus according to the first embodiment of the present invention. A user sets a capture mode by using the operation unit 111 and then provides an instruction to start image capturing by using the operation unit 111.

When the user provides an instruction to start image capturing, the capturing control unit 112 receives a signal corresponding to the instruction and starts an operation of the image stream generating unit 108 (S201). Then, the capturing control unit 112 determines a present capture mode (S202). In a case where the present capture mode is the first capture mode, the process proceeds to perform image capturing in the first capture mode (from S202 to S203). In a case where the present capture mode is the second capture mode, the process proceeds to perform image capturing in the second capture mode (from S202 to S205).

In the first capture mode, an image stream that is generated by the image stream generating unit 108 and that is accumulated in the image stream recording control unit 109 is recorded in the image stream recording unit 110 (S203). Then, it is determined whether an instruction to stop image capturing from the user has been provided from the operation unit 111 (S204). In a case where no instruction to stop image capturing from the user has been provided, the image capturing is continued and recording of an image stream generated by the image stream generating unit 108 is continuously performed (from S204 to S203). In a case where an instruction to stop image capturing from the user has been provided, the operation of the image stream generating unit 108 is stopped to stop image capturing (from S204 to S209).

In the second capture mode, the capturing control unit 112 starts a recording time counter to measure a predetermined capture time (S205). Then, as in the first capture mode, an image stream is recorded in the image stream recording unit 110 (S206). Then, the value of the recording time counter that was started in S205 is checked, and it is determined whether a predetermined recording time has elapsed (S207). In a case where the predetermined recording time has not yet elapsed, image capturing is continued, and recording of the image stream generated by the image stream generating unit 108 is continuously performed (from S207 to S205). In a case where the predetermined recording time has elapsed, the recording time counter is stopped (S208), and the operation of the image stream generating unit 108 is stopped to stop image capturing (from S208 to S209).

In order to stop the operation of the image stream generating unit 108, the capturing control unit 112 instructs the image stream generating unit 108 to stop the operation, so that generation of a new image stream is stopped.

The image stream generating unit 108 transmits the entire image stream that is being generated to the image stream recording control unit 109 and then stops the operation (S209). The image stream recording control unit 109 records the entire image stream received from the image stream generating unit 108 in the image stream recording unit 110 and closes a file, thereby completing recording of the image stream (S210). After recording of the image stream has been completed, management information corresponding to the captured images is generated by the management information control unit 113, capture mode information is embedded in the management information file, and the management information file is recorded in the management information recording unit 114 (S211).

Figure 3:
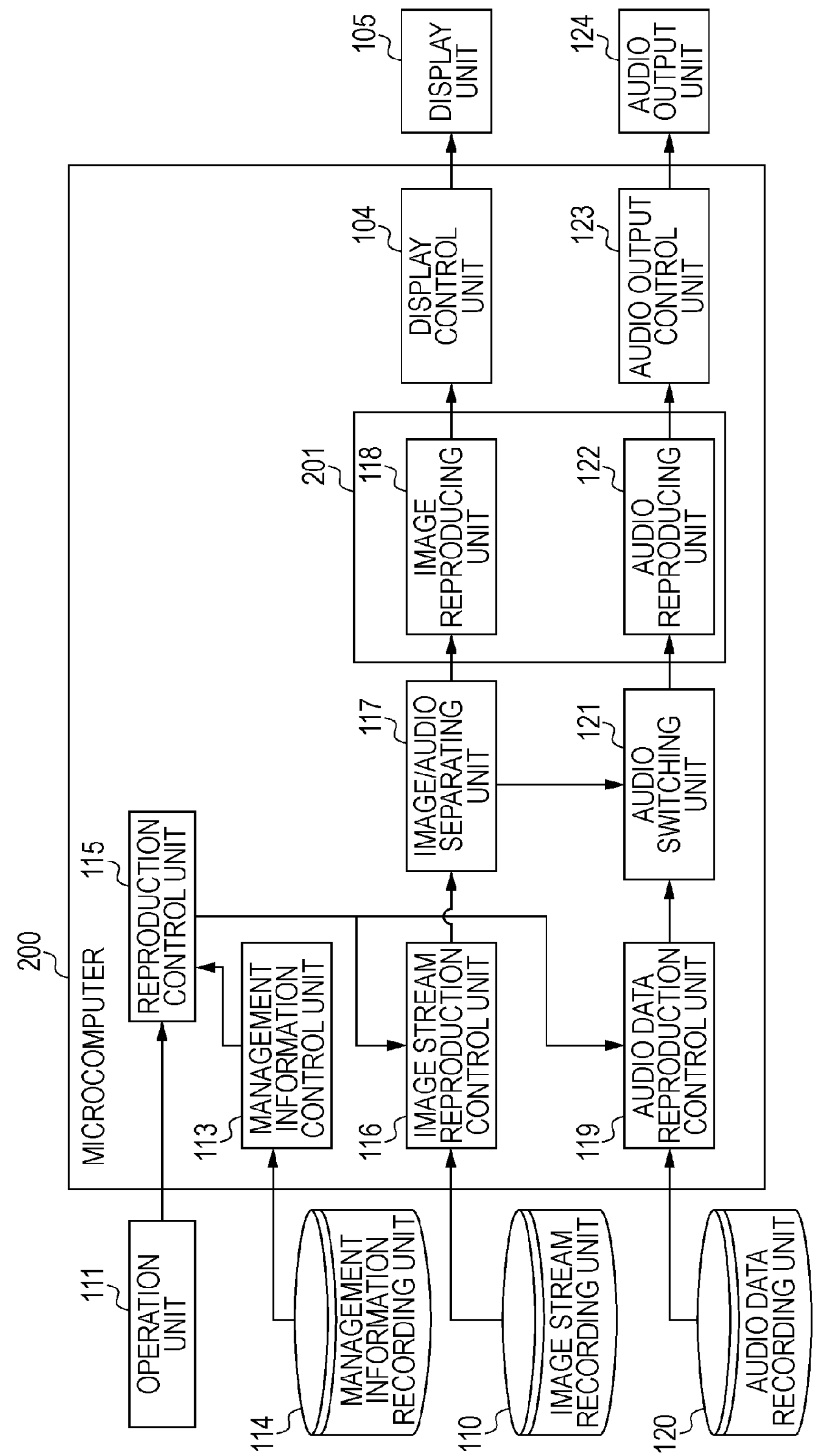
FIG. 3 illustrates a schematic configuration during reproduction of the image capturing/reproducing apparatus according to the first embodiment of the present invention.

FIG. 3 is a block diagram illustrating a configuration during reproduction of the image capturing/reproducing apparatus according to the first embodiment of the present invention.

The operation unit 111 includes a cross key, a reproduction instruction key, a touch panel, an image reproduction mode switching button, and the like provided in the image capturing/reproducing apparatus. When a user operates the operation unit 111, information corresponding to the operation is transmitted as a signal to a reproduction control unit 115.

Operations performed by the user include providing instructions necessary to reproduce images, such as instructions to start and stop reproduction, and also include providing an instruction to switch between a first image reproduction mode and a second image reproduction mode. In the first image reproduction mode, images captured in the first capture mode and images captured in the second capture mode can be displayed mixed together in an index form (first index display mode) and the images can be reproduced. In the second image reproduction mode, only images captured in the second capture mode can be displayed in an index form (second index display mode) and the images can be reproduced. An instruction to switch between the first index display mode and the second index display mode may be provided by using an arbitrary button dedicated for the instruction or an existing button for providing another instruction, or may be a determining step in an entire flow.

In the first reproduction mode, the reproduction control unit 115 displays all images in an index form and reproduces the images regardless of the capture mode in which the images were captured. In the second reproduction mode, the reproduction control unit 115 makes determination on each image whether the image was captured in the second capture mode on the basis of the management information read from the management information control unit 113, and displays only images captured in the second capture mode in an index form and reproduces the images. The management information control unit 113 is connected to the management information recording unit 114, reads management information corresponding to each image from the management information recording unit 114, extracts necessary information from the read management information, and transmits the extracted information to the reproduction control unit 115.

When an instruction to start reproduction is provided from a user via the operation unit 111, the reproduction control unit 115 specifies an image to be reproduced to the image stream reproduction control unit 116. The image stream reproduction control unit 116 reads the image specified by the reproduction control unit 115 from the image stream recording unit 110 and transmits the image to an image/audio separating unit 117.

The image/audio separating unit 117 separates an image signal and an audio signal from each other in the image stream received from the image stream reproduction control unit 116, transmits the image signal to the image reproducing unit 118, and transmits the audio signal to the audio switching unit 121.

The image reproducing unit 118 decodes the image signal received from the image/audio separating unit 117, thereby converting the image signal to an image signal that can be displayed by the display control unit 104, and transmits the image signal to the display control unit 104. The display control unit 104 displays the image signal received from the image reproducing unit 118 on the display unit 105.

Also, when the instruction to start reproduction is provided from the user via the operation unit 111, the reproduction control unit 115 specifies audio data to be reproduced to an audio data reproduction control unit 119.

In a case where the audio data specified by the reproduction control unit 115 is audio data recorded during image capturing, the audio data reproduction control unit 119 instructs the audio switching unit 121 to select the audio data separated by the image/audio separating unit 117. In a case where the audio data specified by the reproduction control unit 115 is audio data specified by the user, the audio data reproduction control unit 119 reads the specified audio data recorded in the audio data recording unit 120. Then, the audio data reproduction control unit 119 transmits the audio data to the audio switching unit 121 and instructs the audio switching unit 121 to select the audio data transmitted from the audio data reproduction control unit 119.

In a case where reproduction of the specified audio data ends before reproduction of images ends, the audio data reproduction control unit 119 reads audio data specified next from the top and transmits the audio data to the audio switching unit 121. Also, the audio data reproduction control unit 119 performs reproduction volume control by starting to gradually decrease the volume of the reproduced audio data at predetermined time before the end of reproduction of the images so that the volume becomes zero at the end of reproduction of the images.

In response to the instruction from the audio data reproduction control unit 119, the audio switching unit 121 selects either of the audio data transmitted from the image/audio separating unit 117 and the audio data transmitted from the audio data reproduction control unit 119, and transmits the selected audio data to an audio reproducing unit 122.

In a case where the audio data received from the image/audio separating unit 117 is added with reproduction timing information or the like used to perform reproduction in synchronization with image data, the audio switching unit 121 performs a process so that the audio data is properly reproduced by the audio reproducing unit 122, for example, adds the reproduction timing information to the audio data received from the audio data reproduction control unit 119.

The audio reproducing unit 122 decodes the audio data received from the audio switching unit 121 so as to convert the audio data to a signal that can be received by an audio output control unit 123, and transmits the signal to the audio output control unit 123. The audio output control unit 123 performs a process, such as volume adjustment or tone quality correction, on the audio data received from the audio reproducing unit 122, converts the audio data to a signal that can be output by an audio output unit 124, and transmits the signal to the audio output unit 124. The audio output unit 124 outputs the audio data received from the audio output control unit 123. The audio data output from the audio output unit 124 may be in the form of sound that is actually output from a speaker or the like, an analog signal of a line output or the like, or a standardized digital signal.

Additionally, part or all of the display control unit 104, the management information control unit 113, the reproduction control unit 115, the image stream reproduction control unit 116, the image/audio separating unit 117, the image reproducing unit 118, the audio data control unit 119, the audio switching unit 121, the audio reproducing unit 122, and the audio output control unit 123 may be configured as a program that operates in the microcomputer 200.

Also, the image reproducing unit 118 and the audio reproducing unit 122 may be configured as a DSP (Digital Signal Processor) that is independent as a decoder for reproducing an image stream.

Figure 4:
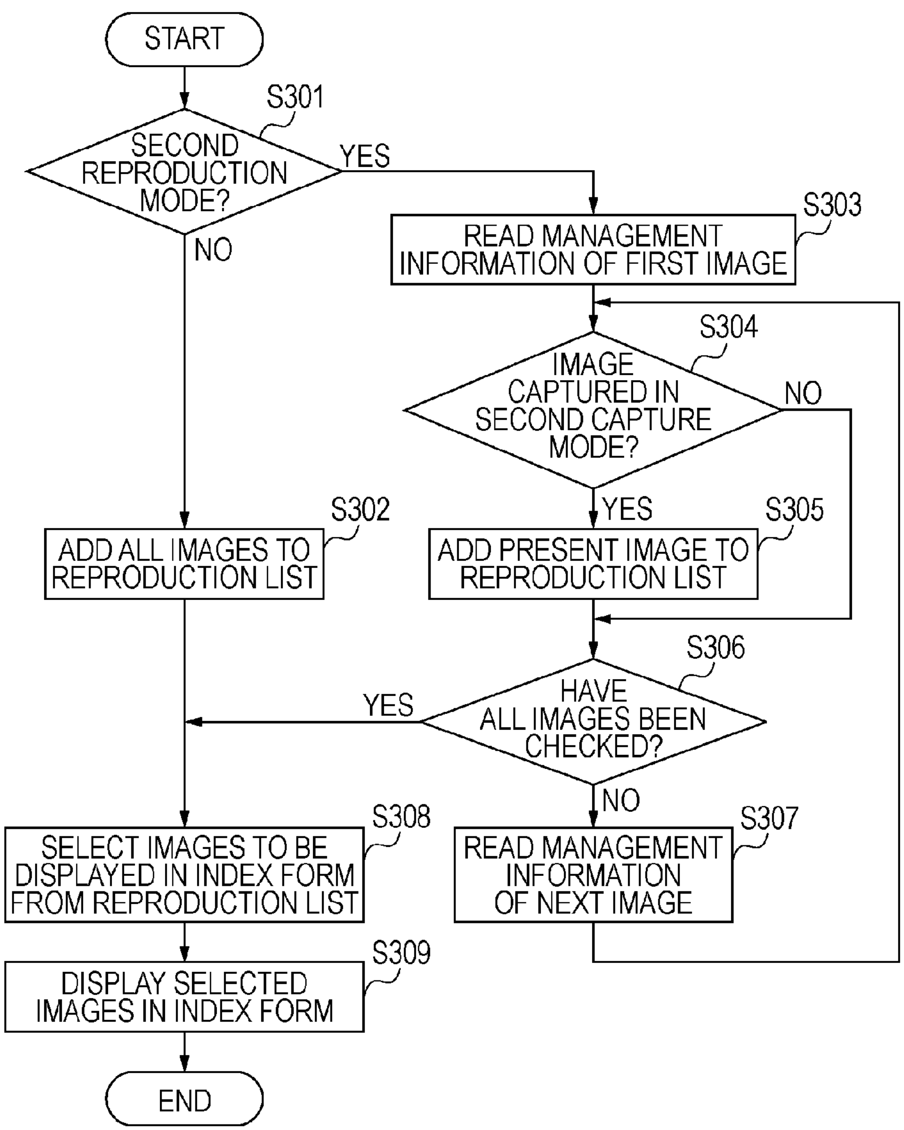
FIG. 4 is a flowchart illustrating an image index display operation of the image capturing/reproducing apparatus according to the first embodiment of the present invention.

FIG. 4 is a flowchart illustrating an image index display operation of the image capturing/reproducing apparatus according to the first embodiment of the present invention. A user sets a reproduction mode by using the operation unit 111 and then provides an instruction to display images in an index form by using the operation unit 111.

After the user has provided the instruction to display images in an index form by operating the operation unit 111, the reproduction control unit 115 determines the present reproduction mode (S301).

In a case where the present reproduction mode is the first reproduction mode, a process of adding all images to a reproduction list is performed (from S301 to S302). In a case where the present reproduction mode is the second reproduction mode, a process of extracting only images captured in the second capture mode is started (from S301 to S303).

In the first reproduction mode, all the images are added to the reproduction list in a captured order (S302).

In the second reproduction mode, in order to make a determination on each image from the first image whether the image was captured in the second capture mode, management information about the first image is read from the management information recording unit 114 via the management information control unit 113 (S303). The reproduction control unit 115 determines, on the basis of the management information, whether the present image is an image captured in the second capture mode (S304). In a case where it is determined that the present image is an image captured in the second capture mode, the present image is added to the reproduction list (from S304 to S305). After that, it is determined whether all the images have been checked (from S305 to S306).

In a case where it is determined that the present image is not an image captured in the second capture mode, the image is not added to the reproduction list, and it is determined whether all the images have been checked (from S304 to S306).

After all the images have been checked, a process of selecting images to be displayed in an index form from the generated reproduction list is performed (S308). In a case where one or more images remain, management information about the next image is read, and it is determined whether the image is captured in the second capture mode (from S307 to S304).

In the process of selecting images to be displayed in an index form from the generated reproduction list, the images to be displayed are selected on the basis of the number of images to be displayed in an index form on the display unit and display positions in the reproduction list (S308). For example, assume that six images can be displayed at a time on an index display screen of the display unit. In this case, when images are to be displayed in an index form starting from the thirteenth image among one hundred images registered in the reproduction list, the thirteenth to eighteenth images are selected.

The reproduction control unit 115 provides an instruction to display the selected images in an index form to the image stream reproduction control unit 116. The image stream reproduction control unit 116 reads the selected images from the image stream recording unit 110 and outputs the images to the display unit 105 via the image/audio separating unit 117, the image reproducing unit 118, and the image control unit 104 (S309).

Figure 5:
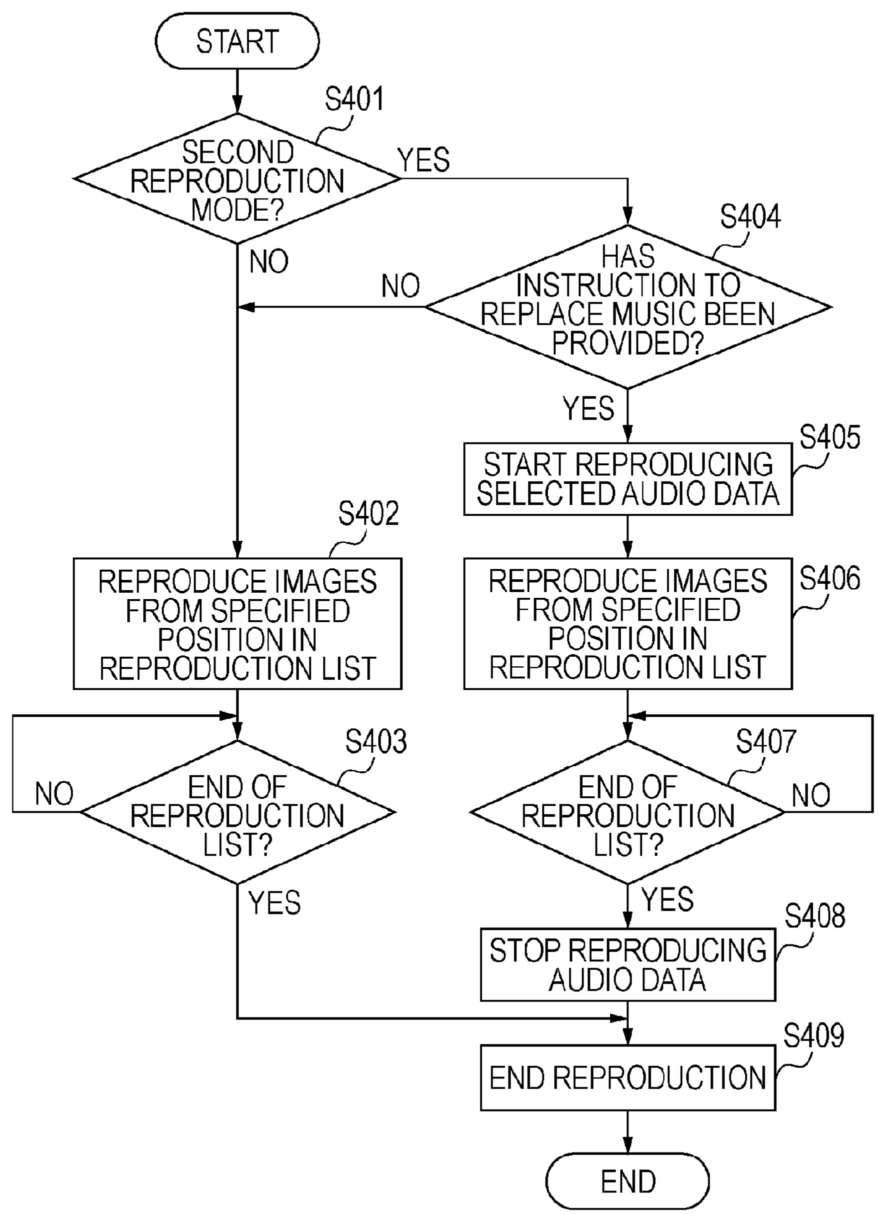
FIG. 5 is a flowchart illustrating a reproducing operation of the image capturing/reproducing apparatus according to the first embodiment of the present invention.

FIG. 5 is a flowchart illustrating a reproducing operation of the image capturing/reproducing apparatus according to the first embodiment of the present invention. A user selects an arbitrary image from among images displayed in an index form and provides an instruction to start reproduction by using the operation unit 111.

In response to the instruction to start reproduction, the reproduction control unit 115 determines which reproduction mode is set (S401).

In a case where the reproduction mode is the first reproduction mode, images are reproduced in accordance with the reproduction list generated at display of an index of images starting from the specified image to be reproduced (from S401 to S402). During reproduction of the images, it is regularly determined whether reproduction has been performed to the end of the reproduction list (S403). In a case where reproduction has been performed to the end of the reproduction list, the reproduction ends (from S403 to S409).

In a case where the reproduction mode is the second reproduction mode, the reproduction control unit 115 determines whether an instruction to replace music has been provided (from S401 to S404).

In a case where an instruction to replace music has not been provided, images are reproduced in accordance with the reproduction list generated at display of an index of images starting from the specified image to be reproduced (from S404 to S402).

In a case where an instruction to replace music has been provided, the reproduction control unit 115 instructs the audio data reproduction control unit 119 to reproduce the audio data that is selected (from S404 to S405). The audio data reproduction control unit 119 continuously repeats reproduction of the specified audio data until reproduction of the images ends. As the audio data, any one or more of a plurality of pieces of audio data can be selected. After reproduction of the audio data has started, images are reproduced starting from the specified image to be reproduced in accordance with the reproduction list generated at display of an index of images (S406). During reproduction of the images, it is regularly determined whether reproduction has been performed to the end of the reproduction list (S407). At this time, a remaining time until the end of the reproduction list is also determined. In a case where the remaining time is shorter than a predetermined audio fade-out time, the audio data reproduction control unit 119 gradually decreases the reproduction volume of the audio data so that the volume becomes zero at the end of the reproduction list. At the end of the reproduction list, reproduction of the audio data is stopped (from S407 to S408). When the stop of reproduction of the audio data is completed, reproduction of the images is stopped (S409).

As described above, by applying the present invention in the manner according to the first embodiment, only images captured in the second capture mode, in which image capturing automatically stops after a predetermined period of time has elapsed since a user provided an instruction to start image capturing, can be extracted and reproduced. Furthermore, second audio data that is prepared separately from first audio data recorded during image capturing (e.g., audio data or a song originally recorded in the image capturing/reproducing apparatus, or audio data or a song recorded in a device outside the image capturing/reproducing apparatus) can be reproduced in place of the first audio data. The reproduced second audio data may be silent data. Accordingly, images are reproduced while being switched from one to another at predetermined time intervals at a good tempo, so that surprising reproduced images can be obtained. Also, since audio data is continuously reproduced, discomfort to a listener can be decreased.

Second Embodiment

Figure 6:
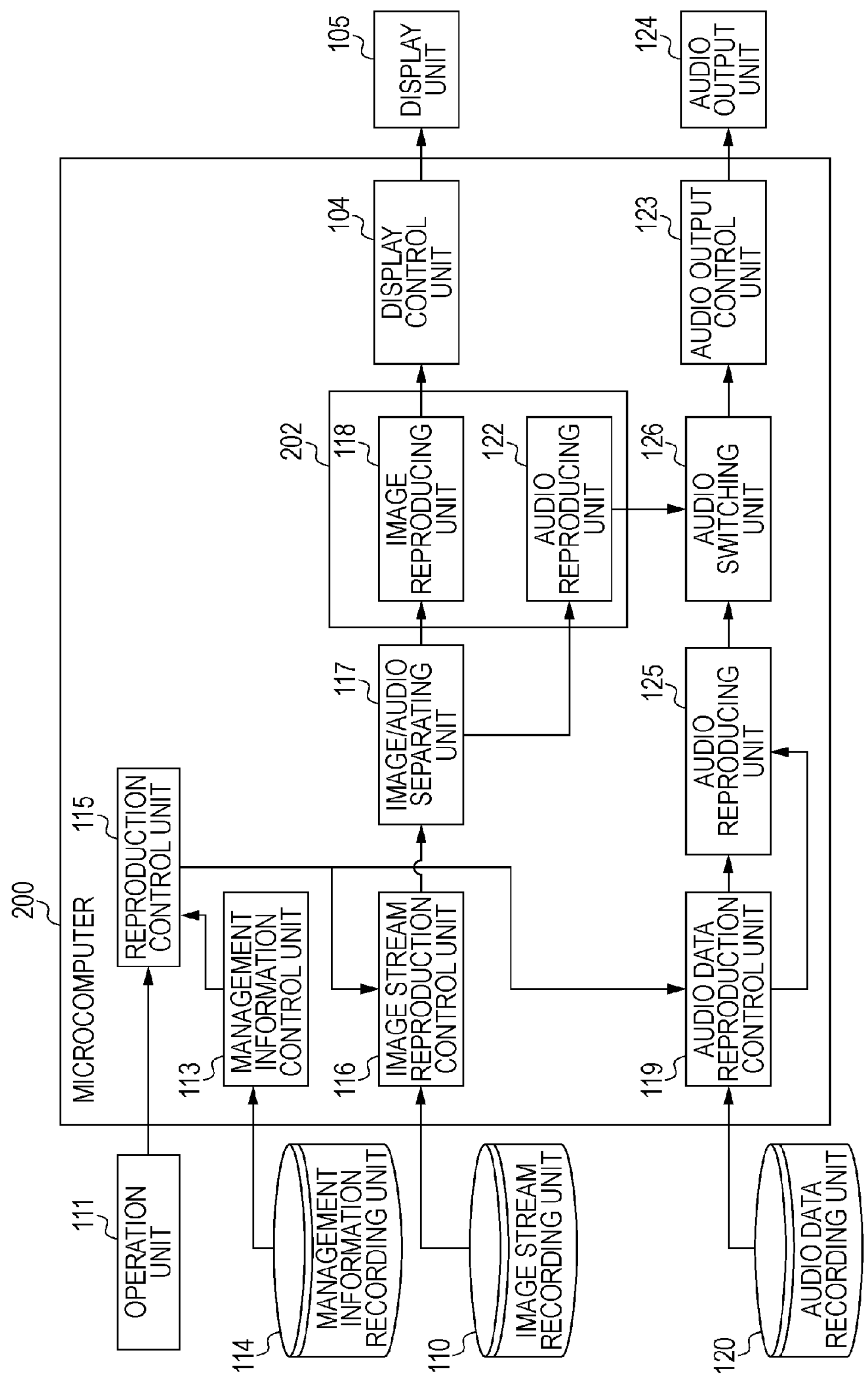
FIG. 6 illustrates a schematic configuration during reproduction of an image capturing/reproducing apparatus according to a second embodiment of the present invention.

FIG. 6 is a block diagram illustrating a configuration during reproduction of an image capturing/reproducing apparatus according to a second embodiment of the present invention.

A description about the parts common to those in the block diagram in FIG. 3 illustrating the configuration during reproduction of the image capturing/reproducing apparatus according to the first embodiment will be omitted, and only the difference therebetween will be described.

Audio data separated by the image/audio separating unit 117 is directly transmitted to the audio reproducing unit 122. The audio reproducing unit 122 decodes the audio data received from the image/audio separating unit 117 so as to convert the audio data to a signal that can be received by the audio output control unit 123, and then transmits the signal to an audio switching unit 126.

In a case where the audio data specified to be reproduced is the audio data recorded during image capturing, the audio data reproduction control unit 119 instructs the audio switching unit 126 to select the audio data transmitted by the audio reproducing unit 122.

In a case where the audio data specified to be reproduced is the audio data specified by a user, the audio data reproduction control unit 119 reads the specified audio data recorded in the audio data recording unit 120. Then, the audio data reproduction control unit 119 transmits the audio data to a second audio reproducing unit 125 that is provided independently of the audio reproducing unit 122 and instructs the audio switching unit 126 to select the audio data transmitted from the second audio reproducing unit 125.

The second audio reproducing unit 125 decodes the audio data received from the audio data reproduction control unit 119 so as to convert the audio data to a signal that can be received by the audio output control unit 123, and transmits the signal to the audio switching unit 126.

As described above, by applying the present invention in the manner according to the second embodiment, the same effect as that in the first embodiment can be obtained. Furthermore, the audio switching unit 126 only needs to switch decoded audio data. That is, the necessity of adding reproduction timing information performed by the audio switching unit 121 according to the first embodiment can be eliminated, so that a simplified configuration can be obtained advantageously.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-313401, filed Dec. 9, 2008, which is hereby incorporated by reference herein in its entirety.

The invention claimed is:

1. An image capturing/reproducing apparatus comprising:

a capture mode switching unit configured to switch between a first capture mode in which a user provides instructions to start and end recording images and a second capture mode in which image capturing automatically ends after a predetermined period of time has elapsed since the user provided an instruction to start recording images;

an image reproduction mode switching unit configured to switch between a first image reproduction mode in which images recorded in the first capture mode and the second capture mode can be reproduced and a second image reproduction mode in which only images recorded in the second capture mode can be reproduced; and a control unit configured to be capable of reproducing first audio data recorded in the first capture mode and the second capture mode and second audio data recorded separately from the first audio data, reproduce the first audio data in a case where the first image reproduction mode is selected by the image reproduction mode switching unit, and reproduce the second audio data in a case where the second image reproduction mode is selected by the image reproduction mode switching unit.

2. The image capturing/reproducing apparatus according to claim 1, further comprising:

an index display mode switching unit configured to switch between a first index display mode in which images recorded in the first capture mode and images recorded in the second capture mode are displayed mixed together in an index form and a second index display mode in which only images recorded in the second capture mode are displayed in an index form.

3. The image capturing/reproducing apparatus according to claim 2, wherein reproduction is performed in the first image reproduction mode in a case where an instruction to start reproduction is provided in the first index display mode, and wherein reproduction is performed in the second image reproduction mode in a case where an instruction to start reproduction is provided in the second index display mode.

4. The image capturing/reproducing apparatus according to claim 2, further comprising:

an operation unit configured to instruct the capture mode switching unit to switch between the first and second capture modes, the operation unit also serving as an operation unit configured to instruct the index display mode switching unit to switch between the first and second index display modes, wherein switching between the first and second capture modes is performed in response to an instruction provided from the operation unit during image capturing, and wherein switching between the first and second index display modes is performed in response to an instruction provided from the operation unit during display of an index.

5. The image capturing/reproducing apparatus according to claim 1, wherein the control unit is capable of controlling a reproduction timing of the images recorded in the second capture mode and a reproduction timing of the second audio data independently of each other, and wherein, in a case where reproduction of the second audio data ends before reproduction of the images recorded in the second capture mode ends, audio data specified subsequently is reproduced.

6. The image capturing/reproducing apparatus according to claim 1, further comprising:

an audio selecting unit configured to arbitrarily select one or more of a plurality of pieces of audio data, wherein the control unit continuously reproduces the audio data selected by the audio selecting unit as the second audio data.

7. The image capturing/reproducing apparatus according to claim 1, wherein the control unit includes a reproduction volume control unit configured to control a reproduction volume of the second audio data, and wherein the reproduction volume control unit gradually decreases the reproduction volume of the second audio data in accordance with an end timing of reproduction of the images recorded in the second capture mode.

8. The image capturing/reproducing apparatus according to claim 1, wherein the second audio data is silent data.

9. An image capturing/reproducing apparatus comprising:

a capture mode switching unit configured to switch between a first capture mode in which a user provides instructions to start and end recording images and a second capture mode in which image capturing automatically ends after a predetermined period of time has elapsed since the user provided an instruction to start recording images;

an image reproduction mode switching unit configured to switch between a first image reproduction mode in which images recorded at least in the first capture mode can be reproduced and a second image reproduction mode in which only images recorded in the second capture mode can be reproduced; and a control unit configured to be capable of reproducing first audio data recorded at least in the first capture mode and second audio data recorded separately from the first audio data, reproduce the first audio data in a case where the first image reproduction mode is selected by the image reproduction mode switching unit, and reproduce the second audio data in a case where the second image reproduction mode is selected by the image reproduction mode switching unit.

10. An image capturing/reproducing apparatus comprising:

a capture mode switching unit configured to switch between a first capture mode in which a user provides instructions to start and end recording images and a second capture mode in which image capturing automatically ends after a predetermined period of time has elapsed since the user provided an instruction to start recording images;

an image reproduction mode switching unit configured to switch between a first image reproduction mode in which images recorded in the first capture mode can be reproduced and a second image reproduction mode in which only images recorded in the second capture mode can be reproduced; and a control unit configured to be capable of reproducing first audio data recorded in the first capture mode and second audio data recorded separately from the first audio data, reproduce the first audio data in a case where the first image reproduction mode is selected by the image reproduction mode switching unit, and reproduce the second audio data in a case where the second image reproduction mode is selected by the image reproduction mode switching unit.

11. An image capturing/reproducing apparatus comprising:

a capture mode switching unit configured to switch between a first capture mode in which a user provides instructions to start and end recording images and a second capture mode in which image capturing automatically ends after a predetermined period of time has elapsed since the user provided an instruction to start recording images;

an image reproduction mode switching unit configured to switch between a first image reproduction mode in which images and audio recorded in the first capture mode can be reproduced and a second image reproduction mode in which only images recorded in the second capture mode can be reproduced; and a control unit configured to be capable of reproducing second audio data recorded separately from the audio data, reproduce the second audio data in the case where the second image reproduction mode is selected by the image reproduction mode switching unit.

* * * * *